United States Patent
McCarthy et al.

[15] 3,649,949
[45] Mar. 14, 1972

[54] QUICK DISCONNECT FLUID-ELECTRICAL COUPLER

[72] Inventors: James W. McCarthy, Anaheim; Thomas F. Opferman, Los Alamitos, both of Calif.

[73] Assignee: Northrop Corporation, Beverly Hills, Calif.

[22] Filed: June 22, 1970

[21] Appl. No.: 48,298

[52] U.S. Cl. ...................................... 339/16 R, 339/60 R
[51] Int. Cl. .................................................. H01r 3/04
[58] Field of Search ............... 339/15, 16, 40, 42, 59, 60, 339/48; 174/21, 22, 47

[56] References Cited

UNITED STATES PATENTS

| | | | |
|---|---|---|---|
| 3,082,394 | 3/1963 | Hahn et al. | 339/16 R |
| 2,864,628 | 12/1958 | Edleson | 339/16 R |
| 2,307,393 | 1/1943 | Crowley | 339/16 R X |
| 3,441,898 | 4/1969 | Nodfelt | 339/48 |
| 3,524,160 | 8/1970 | Robinson | 339/34 |
| 2,700,141 | 1/1955 | Jones | 339/96 |
| 3,271,725 | 9/1966 | Bloch | 339/42 |

*Primary Examiner*—Marvin A. Champion
*Assistant Examiner*—Robert A. Hafer
*Attorney*—Harold L. Fox and Willard M. Graham

[57] ABSTRACT

A quick connect-disconnect coupler utilized to convey a pressurized gas and electrical energy to an installation submerged in a liquid body, the pressurized gas flowing to the installation functioning to effect and maintain the integrity of the electrical connection particularly at such time as the coupler is rendered operational.

5 Claims, 4 Drawing Figures

PATENTED MAR 14 1972
3,649,949
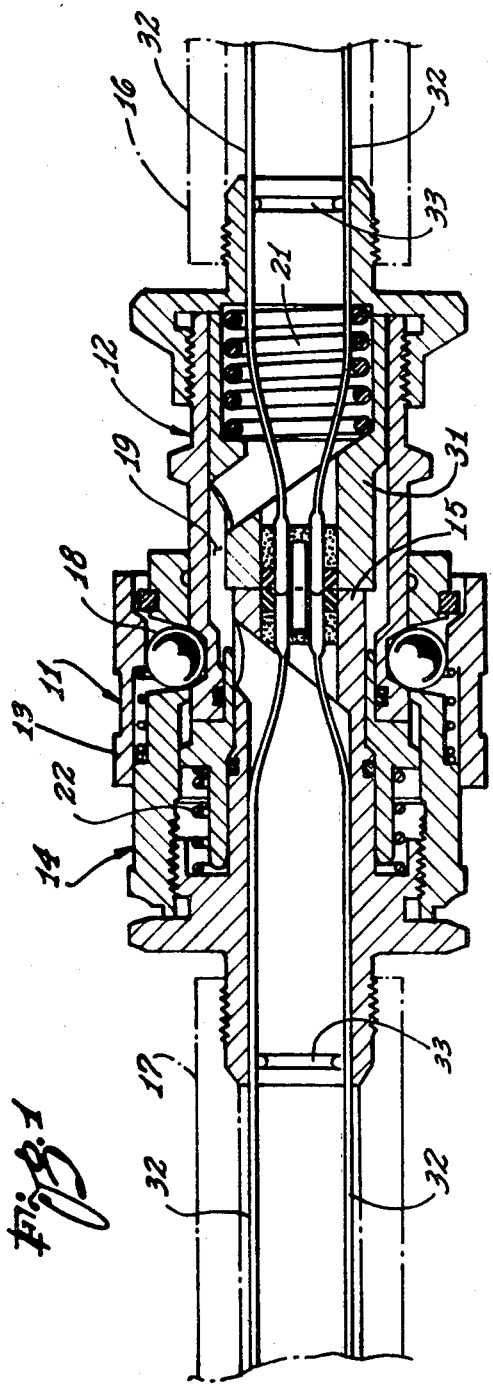
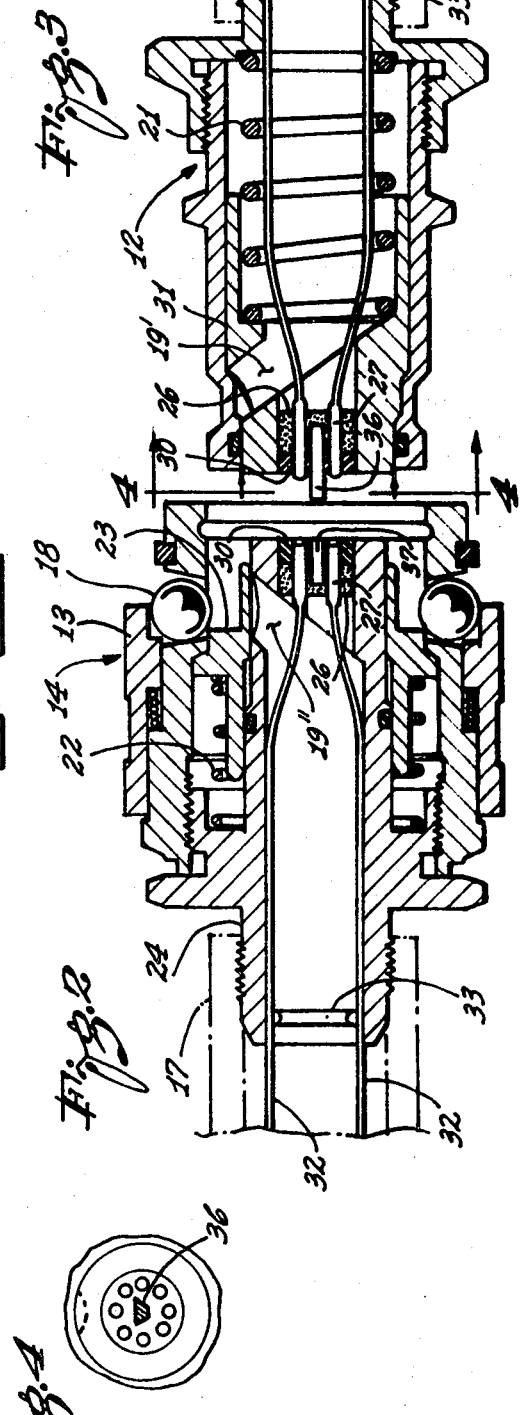
INVENTORS:
James W. McCarthy
Thomas F. Opterman
By Harold L. Fox
AGENT

QUICK DISCONNECT FLUID-ELECTRICAL COUPLER

The present invention relates to connectors or couplings and more particularly to quick connect-disconnect couplings functioning to simultaneously convey pressurized gas and electrical energy to an installation submerged in a liquid body.

In most installations submerged in a liquid body, such as undersea laboratories for example, it is necessary to convey electrical energy and certain gasses thereto for operational purposes. In the past this has been accomplished by utilizing separate or independent conduits or lines for each commodity. The maintenance of such lines or conduits has proven quite troublesome due to frequency of moving equipment served thereby, replacement and repair of such lines etc. Accordingly it is desirable to utilize connectors or couplings of a quick connect-disconnect type. Also, for reasons of economy and efficiency, it is desirable to combine the lines or conduits, supplying gas and electrical energy, to a single carrier of the quick connect-disconnect type. To the best of applicant's knowledge this feature, employing structure as disclosed herein, is not known to date.

In the present disclosure, fluid having a pressure exceeding that of the surrounding liquid and novel structure is utilized to effect and maintain the integrity of electrical connections, particularly after the fluid connections have been made. The novel structure and the manner in which it functions will become apparent as the disclosure progresses.

A principal object of this invention is to provide a quick connect-disconnect coupling or connector adapted to simultaneously convey gas and electrical energy to an installation submerged in a liquid body.

Another object is to provide a combined quick connect-disconnect connector or coupling adapted to simultaneously carry gas and electrical energy to an installation submerged in a body of liquid, and functioning to effectively establish and maintain the integrity of the electrical connection.

Another object is to provide a combined quick connect-disconnect connector or coupling, adapted to function at underwater locations and to simultaneously convey gas and electrical energy, which is free of malfunctioning tendencies, is economical to manufacture, and more economical in operation than other types of connectors.

FIG. 1 is a longitudinal sectional view of the connect-disconnect coupler disclosed herein.

FIG. 2 is a longitudinal sectional view of the female or coupling portion of the coupler of FIG. 1.

FIG. 3 is a view similar to FIG. 2 but showing the male or nipple portion of the coupler of FIG. 1.

FIG. 4 is an end view of FIG. 3 as shown by the line 4—4 in the latter figure.

Referring to the drawing, FIG. 1 shows the combined quick connect-disconnect 11, comprising male nipple and female coupling members 12 and 14 respectively of the type disclosed herein. The connector is similar to a type manufactured by SNAP-TITE, Inc. (Series 29) characterized by the fact that the internal values of the connector are completely closed at such times as the male and female members of the connector are separated as shown in FIGS. 2 and 3. The operation of the connector 11, insofar as its fluid carrying capacity is concerned, is well known to those skilled in the art. However, a brief description of the connector follows rendering the disclosure complete in this respect.

Respective outboard ends of the male nipple and female coupling members 12 and 14, are secured to conduits 16 and 17, one leading from sources of fluid and electrical energy (not shown) and the other to an installation (not shown) submerged below the surface of a body of liquid. Referring further to FIG. 1, it will be seen that the members 12 and 14 are maintained in operational or contacting relationship by conventional ball locking means 18 releasable by an outer sleeve 13. At such times as the portions 12 and 14 are in their operational position they cooperate to define a continuous fluid (gas) passageway 19 therethrough. It will be noted that in this engaged operative position, a rigid inner body face 15 of a coupling housing 24 is substantially abutting and holding open a pluglike valve member 31 in the substantial geometric center of the connector 11.

At such times as the members 12 and 14 are in their nonoperational or separated positions, as shown in FIGS. 2 and 3, various components of the male and female members function to close passageway 19 precluding the escape of fluid (gas) from the passageway 19, and liquid from entering the same. When the connector 11 is rendered nonoperational that is, the portions 12 and 14 are separated, a spring 21 functions to urge the plug valve member 31 to the left in the nipple 12 (FIG. 3) thereby closing the portion 19' of the passageway 19. Also a spring 22 functions to urge the extending end of a sleevelike valve member 23 to the right in the coupling 14 (FIG. 2) functioning to close the portion 19'' of the passageway 19 as best seen in FIG. 2.

Thus it will be seen that gas flow through the passageway 19 is effectively arrested at such times as the members 12 and 14 are caused to assume their nonoperational positions. In this respect the conduits 16 and 17 have a degree of flexibility making possible the easy separation and joining of the male and female members of the connector 11.

The connector 11 as described above is modified to provide a combined quick-connect-disconnect coupling as disclosed herein.

The central portions of the body face 15 and of the pluglike valve member 31 contain a body of potting compound 26. Electrical connectors or pins 27 are positioned in the potting compound 26 in fluid tight relation. Also the potting compound 26 has a fluid tight relation with respect to the body fact 15 and the valve member 31. The pins 27, located in the male and female portions 12 and 14, have an abutting relation as best seen in FIG. 1. Positioned adjacent each of the facing ends of the compound 26 is a body of soft rubber 30 functioning in a manner presently explained.

Secured to the pins 27, positioned in both the male and female connections, are electrical leads 32. Spring clips or rings 33, are preferably provided adjacent the outboard end of male and female members operating to maintain the passageway 19 clear; i.e., to keep the leads 32 from bunching up when exposed to gas flow.

The proper relationship of the male and female members of the connector 11, insuring the continuity of specific electric circuits, is achieved by a locating pin 36 provided in one of the bodies of potting material 26 adapted to be received in an indentation 37 formed in the other body of potting compound, as best seen in FIGS. 2 and 3.

At such times as the male and female members of the connector 11 are caused to assume their operational positions (FIG. 1), the body of soft rubber 30, extends slightly beyond the ends of the pins 27, rendering the pins 27 practically free of liquid and insuring good contact between respective pins. The integrity of the electrical connections is further maintained in that gas escaping from the passageway 19, if any, will find its way between the bodies of soft rubber 30 thus insuring that the abutting relation of the pins 27 will be rendered perfectly dry, and the efficiency of the electrical connections maintained. In other words, the gas pressure being preferably greater than the sea water, for example, at the depth of the connector, will keep the electrical contacts dry by preventing leakage or seepage of water between the connector joints into the center thereof.

Thus it is seen a quick connect-disconnect connector is provided providing the various objects set forth above.

We claim:

1. In a quick connect-disconnect coupler for simultaneously transferring fluids and electrical energy from sources of supply to an installation submerged in a body of liquid, the electrical connections being automatically and simultaneously effected as the fluid connection is made, the combination comprising:

a. a male nipple member and a female coupling member having inboard facing ends adapted to be coupled together, said members having outboard ends adapted to be connected to hollow tubular conduits and having central fluidtcarrying bores therein;

b. valve means in each of said male and female members constructed to be closed when said members are separated and open when said members are joined;

c. said valve means including a fixed inner end face element in the center of one of said members and a movable plug valve element in the center of the other said member, said fixed element positioned to contact and open said plug valve element when said members are joined; and d. at least one electrical connector element in the center portion of said fixed element at the inboard end thereof and at least one other electrical connector element in the central portion of said movable valve element;

e. said electrical connector elements positioned to mate with each other and make an electrical connection when said members are joined.

2. Apparatus in accordance with claim 1 wherein said electrical connector elements are pins, and wherein said pins are in abutting end-to-end relation when said members are joined.

3. Apparatus in accordance with claim 1 including a. a plurality of said electrical connector elements in each said member;

b. a plurality of electrical conductor leads connected respectively to said electrical connector elements and extending outwardly through said bores;

c. a resilient annular element positioned in said bore of at least one of said members, said annular element spreading radially outwardly against said leads to hold said leads against the outer wall of said bore, whereby said leads are prevented from bunching together and impeding fluid flow through said members and valve means.

4. Apparatus in accordance with claim 1 including a potting compound in which said electrical connector elements are sealed in their respective positions.

5. Apparatus in accordance with claim 4 wherein said potting compound does not extend entirely to the inboard ends of said electrical connector elements, and including a filling of soft rubberlike material around the circumference of each of said electrical connector elements in the space left by said potting compound.

* * * * *